United States Patent
Chen et al.

(10) Patent No.: US 11,962,219 B2
(45) Date of Patent: Apr. 16, 2024

(54) CONTROL SYSTEM AND CONTROL METHOD OF FLEXIBLE PERMANENT MAGNET BRUSHLESS DC MOTOR

(71) Applicant: TIANGONG UNIVERSITY, Tianjin (CN)

(72) Inventors: Wei Chen, Tianjin (CN); Lixiang Zhu, Tianjin (CN); Tingna Shi, Tianjin (CN); Changliang Xia, Tianjin (CN)

(73) Assignee: TIANGONG UNIVERSITY, Tianjin (CN)

( * ) Notice: Subject to any disclaimer, the term of this patent is extended or adjusted under 35 U.S.C. 154(b) by 0 days.

(21) Appl. No.: 17/429,496

(22) PCT Filed: Jun. 3, 2020

(86) PCT No.: PCT/CN2020/094190
§ 371 (c)(1),
(2) Date: Aug. 9, 2021

(87) PCT Pub. No.: WO2021/212618
PCT Pub. Date: Oct. 28, 2021

(65) Prior Publication Data
US 2022/0311304 A1 Sep. 29, 2022

(30) Foreign Application Priority Data
Apr. 20, 2020 (CN) .......................... 202010313747.8

(51) Int. Cl.
*H02K 5/22* (2006.01)
*H02K 3/28* (2006.01)
*H02P 6/00* (2016.01)

(52) U.S. Cl.
CPC .................. *H02K 5/22* (2013.01); *H02K 3/28* (2013.01); *H02P 6/00* (2013.01); *H02K 2213/03* (2013.01)

(58) Field of Classification Search
CPC ........ H02K 23/60; H02K 16/00; H02K 17/00; H02K 29/00; H02K 1/16; H02K 1/27; H02K 3/12; H02K 5/22; H02P 6/00
See application file for complete search history.

(56) References Cited

FOREIGN PATENT DOCUMENTS

| CN | 2870300 Y | 2/2007 |
|---|---|---|
| CN | 101252302 A | 8/2008 |

(Continued)

OTHER PUBLICATIONS

International Search Report of PCT/CN2019/112244.

*Primary Examiner* — Said Bouziane

(57) ABSTRACT

A control system of a flexible permanent magnet brushless DC motor, comprising a DC power supply, a filter capacitor, a voltage source inverter, a permanent magnet brushless DC motor and a controller, wherein an output end of the DC power supply is connected with the filter capacitor in parallel; the voltage source inverter is provided with m bridge arms which are connected with both ends of the filter capacitor in parallel; upper and lower controllable switching devices are arranged on each bridge arm; the phase number of armature winding of the permanent magnet brushless DC motor is equal to the number of bridge arms; head ends of armature windings of each phase are correspondingly connected with intermediate contacts of the upper and lower controllable switching devices of one bridge arm, tail ends of armature windings of each phase are connected together.

14 Claims, 3 Drawing Sheets

(56) References Cited

FOREIGN PATENT DOCUMENTS

| | | | |
|---|---|---|---|
| CN | 102158035 A | * | 8/2011 |
| CN | 102710204 A | | 10/2012 |
| CN | 103078586 A | | 5/2013 |
| CN | 105790666 A | | 7/2016 |
| CN | 109687779 A | | 4/2019 |
| FR | 3051295 A1 | * | 11/2017 ............. H02K 11/33 |
| JP | 2006157994 A | | 6/2006 |

* cited by examiner

CONTROL SYSTEM AND CONTROL METHOD OF FLEXIBLE PERMANENT MAGNET BRUSHLESS DC MOTOR

CROSS-REFERENCE TO RELATED APPLICATIONS

This Application is a national stage application of PCT/CN2020/094190. This application claims priorities from PCT Application No. PCT/CN2020/094190, filed Jun. 6, 2020, and from the Chinese patent application 202010313747.8 filed Apr. 20, 2020, the content of which are incorporated herein in the entirety by reference.

TECHNICAL FIELD

The present invention relates to a control system and a control method of a brushless direct current (DC) motor, in particular to a control system and a control method of a flexible permanent magnet brushless DC motor.

BACKGROUND OF THE PRESENT INVENTION

At present, the permanent magnet brushless DC motor replaces brush commutation of the traditional DC motor with an electronic commutation technology to retain superior performance of the DC motor, such as large starting torque, fast speed regulation response and other characteristics. It has advantages of simple structure, convenient maintenance and reliable operation of the AC motor, and the rotor is excited by permanent magnet materials, thereby having no excitation loss. With the in-depth study on new permanent magnet materials and power electronic technology, the production and the application of brushless DC motors in national economy are greatly improved. At present, the brushless DC motor has been widely used in the fields of medical devices, household appliances, electric vehicles and the like.

A three-phase Y-connection method is mainly adopted in the traditional permanent magnet brushless DC motor. In an ideal working state, the back electromotive force (BEF) is shown as a trapezoidal wave with a 120° flat-top width in space, the phase current is a rectangular wave in the same phase as the flat-top part of the BEF. The armature winding has six different conduction states every time the rotor rotates at an electrical angle of 120°, and the motor has a constant electromagnetic torque and relatively high power density in such a working state. However, the three-phase permanent magnet brushless DC motors have a common problem of relatively great fluctuation in commutation torque. Taking the driving of three-phase six-state permanent magnet brushless DC motor as an example, the current in the armature winding is switched from one phase to another every time the motor goes through a conduction state. Due to the inductance of the armature winding, current change rates of the current rising phase and the current decaying phase are different during commutation, so that the electromagnetic torque for the synthesis of three-phase current is changed, thereby causing torque fluctuations.

A three-phase full-bridge inverter circuit is mainly used as a driving circuit of three-phase permanent magnet brushless DC motor. The topological structure has the advantages of simple structure, convenient control and fewer controllable switches. However, in low-voltage and high-power occasions, a plurality of controllable switches must be connected in parallel on each bridge arm of an inverter, thereby easily leading to failure due to uneven current distribution and thus affecting the reliability of the system.

SUMMARY OF THE PRESENT INVENTION

To solve technical problems in the prior art, the present invention provides a control system and a control method of a flexible permanent magnet brushless DC motor, which reduces torque fluctuations and have high reliability.

The following technical solution is adopted by the present invention: a control system of a flexible permanent magnet brushless DC motor comprises a DC power supply, a filter capacitor, a voltage source inverter, a permanent magnet brushless DC motor and a controller. The output end of the DC power supply is connected with the filter capacitor in parallel. The voltage source inverter is provided with m bridge arms which are connected with both ends of the filter capacitor in parallel. Upper and lower controllable switches are arranged on each bridge arm, respectively. The phase number of armature winding of the permanent magnet brushless DC motor is equal to the number of bridge arms. Head ends of armature windings of each phase are correspondingly connected with intermediate contacts of the upper controllable switch and the lower controllable switch of one bridge arm. Tail ends of armature windings of each phase are connected together. An electrical angle 360° of the permanent magnet brushless DC motor is divided into a plurality of sectors. The controller determines the sectors corresponding to an N pole of a rotor according to the position of the rotor, and outputs a control signal in combination with the direction of the electromagnetic torque required by the motor to drive the corresponding controllable switch to be turned on or off. When the permanent magnet brushless DC motor is required to generate a counterclockwise rotation torque, the head ends of the n-phase armature windings under the N pole of the rotor are simultaneously conducted with a positive pole of the DC power supply, and the head ends of the n'-phase armature windings under an S pole of the rotor are simultaneously conducted with a negative pole of the DC power supply. When the permanent magnet brushless DC motor is required to generate a clockwise rotation torque, the head ends of the n-phase armature windings under the N pole of the rotor are simultaneously conducted with the negative pole of the DC power supply, the head ends of the n'-phase armature windings under the S pole of the rotor are simultaneously conducted with the positive pole of the DC power supply, and $n+n' \leq m$.

Further, the control system of the flexible permanent magnet brushless DC motor also comprises a rotor position detection module or a rotor position estimation module. The rotor position detection module comprises a rotor position sensor, which collects data of rotation angle of the rotor and sends the collected data to the controller. The rotor position estimation module collects terminal voltage or data of phase current of each phase for calculation to obtain the data of rotation angle of the rotor, and sends the calculated data of rotor position to the controller.

Further, the armature windings of the permanent magnet brushless DC motor are single-layer armature windings. It is assumed that one of the armature windings is numbered i, $i=1, 2, \ldots m$. When $i<m$, the head ends of $i^{th}$-phase armature windings and the tail ends of $(i+1)^{th}$-phase armature windings are alternately arranged in sequence along a circumferential direction. When m is an even number, the head ends of $m^{th}$-phase armature windings are adjacent to the head ends of first-phase armature windings, and the tail ends of the $m^{th}$-phase armature windings are adjacent to the tail ends of the first phase armature windings. When m is an odd number, the head ends of the $m^{th}$-phase armature windings are adjacent to the tail ends of the first-phase armature windings, and the tail ends of the $m^{th}$-phase armature windings are adjacent to the head ends of the first-phase armature windings.

Further, m=12.

Further, the armature windings of the permanent magnet brushless DC motor are hairpin armature windings. The armature windings are inserted into a semi-opened or closed slot, neutral points are composed of copper end rings, and the tail ends of the armature windings are connected to the end rings in a way of wedge, mortise, tenon or welding.

Further, an air-gap magnetic density distribution waveform of the permanent magnet brushless DC motor is a flat-top wave.

The present invention further provides a control method of a flexible permanent magnet brushless DC motor utilizing the control system of the flexible permanent magnet brushless DC motor. The permanent magnet brushless DC motor is commutated once every 180°/m, and the electrical angle 360° is evenly divided into 2*m sectors. The current flows into the n-phase armature windings and flows out of the n'-phase armature windings during each commutation, n+n'≤m. The remaining armature windings are suspended.

Further, a boundary line where a radial magnetic field between the N pole and the S pole of the permanent magnet brushless DC motor is zero is taken as a physical center line, and it is assumed that the armature winding on the physical center line is numbered k. When armature windings of one phase are suspended, $k^{th}$-phase armature windings are suspended. When armature windings of more than two phases are suspended, the $k^{th}$-phase armature windings and the armature windings arranged on the left and right of the $k^{th}$-phase armature windings in sequence are suspended.

Further, in a constant-power operation state, a given reference rotating speed range is divided into a plurality of reference rotating speed intervals. A comparison table for the reference rotating speed intervals, the phase number of the armature windings conducted at the same time and a hysteresis comparator are provided. The phase number of the armature windings conducted at the same time in the comparison table is sequentially decreased by one with the decrease of the reference rotating speed. A threshold of the hysteresis comparator is set. For each given reference rotating speed, the phase number of the armature windings initially conducted at the same time is determined by the comparison table. When a difference between the reference rotating speed and the maximum speed in a current rotating speed interval is greater than the threshold, the phase number of the armature windings connected at the same time is increased by one. When the difference between the reference rotating speed and the minimum rotating speed of the current rotating speed interval in the table is smaller than the negative threshold, the phase number of the armature windings conducted at the same time is decreased by one.

Further, corresponding to each reference rotating speed interval, the DC power supply voltage is modulated into a pulse voltage sequence with a constant frequency and a variable width.

The present invention has the following advantages and positive effects: the control system of the flexible permanent magnet brushless DC motor provided by the present invention makes full use of the controllable switch, to not only exert the advantages of the brushless DC motor, but also weaken the torque fluctuation. The present invention improves the power density and load capacity of the motor system, broadens the speed regulation range, reduces the torque fluctuation, and has four advantages as follows.

1. Volume and weight: the control system has high torque density and power density. The m-phase flexible permanent magnet brushless DC motor can implement the simultaneous connection of n+n' phases (n+n'/m of the armature windings are conducted at any time), and n+n'≤/m. Compared with ordinary three-phase pairwise-conducted brushless DC motors (⅔ of the armature windings are conducted at any time), the torque density and the power density will be improved. For example, the torque density and the power density of a 12-phase permanent magnet brushless DC motor are expected to increase by about 37%.

2. Torque: (1) the control system has a high average electromagnetic torque. Due to high utilization rate of armature windings, so that it has high electromagnetic torque and strong overload capacity, and (2) the system for the flexible permanent magnet brushless DC motor has small torque fluctuation. Because only 1/(m−1) of electromagnetic torque is switched in each commutation in an m−1 conduction mode, compared with the ordinary three-phase pairwise-conducted brushless DC motor, the torque fluctuation is greatly reduced. Taking the 12-phase motor as an example, the torque switched in each commutation is 1/11, which is 80% lower than that of the traditional three-phase motor, and torque fluctuation will also be greatly reduced.

3. Rotating speed: (1) Simple control and flexible speed regulation. Because the system for the flexible permanent magnet brushless DC motor can implement hierarchical speed regulation through conduction modes and pulse width modulation, the rotating speed can be divided according to the driving ability of different conduction modes, and then the speed can be regulated through pulse width modulation in each interval. (2) Wide speed regulation range. Because the driving voltage is square wave, and the utilization rate of the armature windings is high, the speed regulation range is wide.

4. Reliability: (1) High reliability. Because all controllable switches are not required to be connected in parallel, the failure risk caused by uneven current is avoided. In addition, conduction signals of an upper switch and a lower switch of any bridge arm are usually separated by the suspended state, so it is unnecessary to set a dead sector. (2) Strong fault tolerance and load capacity. Because each phase can be controlled separately, the load capacity under fault-tolerant control is greatly improved in comparison with the group-cutting multi-phase motor control system.

5. The present invention can be applied to many fields such as medical instruments, household appliances, electric vehicles, more electric aircrafts (MEA) and ship propulsion, and especially has important practical value and wide application prospect for improving the running performance, safety and reliability of the electric vehicles.

Figure 1:
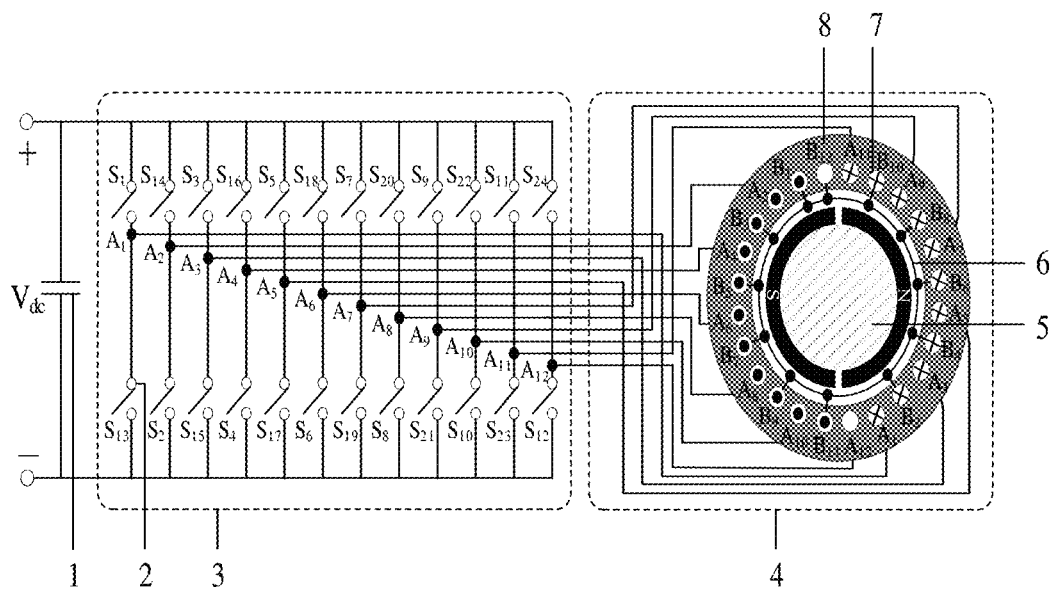
FIG. 1 is a functional block diagram of a system for a 12-phase flexible permanent magnet brushless DC motor according to the present invention.
Figure 2:
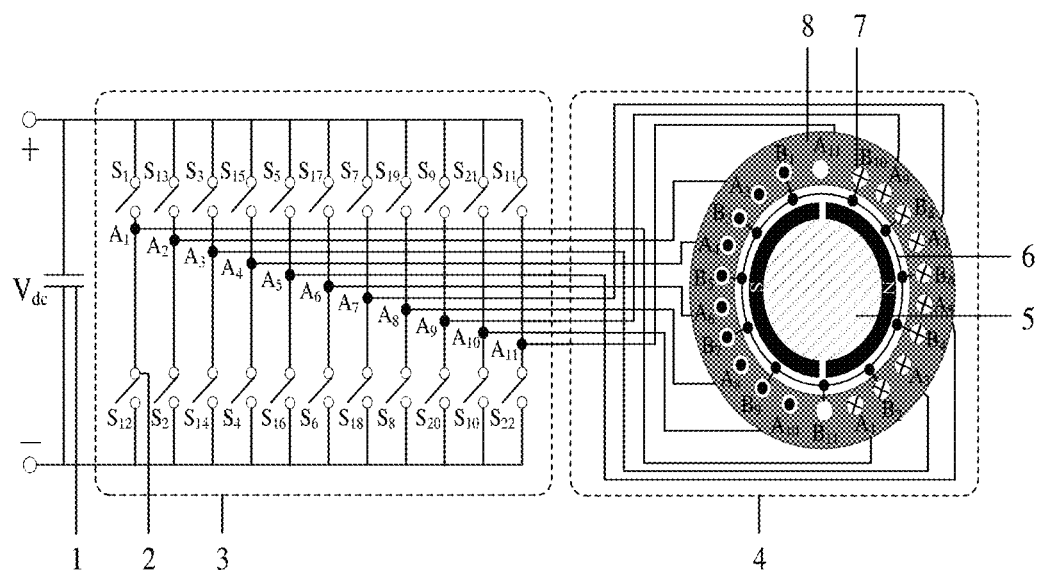
FIG. 2 is a functional block diagram of a system for a 11-phase flexible permanent magnet brushless DC motor according to the present invention.

Wherein:

1. filter capacitor;
2. controllable switch;
3. voltage source inverter;
4. permanent magnet brushless DC motor;
5. rotor;
6. end ring;
7. armature winding;
8. stator;
9. power switching device;
10. freewheeling diode.

DETAILED DESCRIPTION OF THE PRESENT INVENTION

In order to further understand the contents, features and effects of the present invention, the following embodiments will be listed and detailed with reference to the accompanying drawings:

Referring to FIGS. 1-6, a control system of a flexible permanent magnet brushless DC motor comprises a DC power supply, a filter capacitor 1, a voltage source inverter 3, a permanent magnet brushless DC motor 4 and a controller. The output end of the DC power supply is connected with the filter capacitor 1 in parallel. The voltage source inverter 3 is provided with m bridge arms which are connected with both ends of the filter capacitor 1 in parallel. Upper and lower controllable switches 2 are arranged on each bridge arm, respectively. The phase number of armature winding of the permanent magnet brushless DC motor 4 is equal to the number of bridge arms. Head ends of armature windings 7 of each phase are correspondingly connected with intermediate contacts of the upper and lower controllable switches 2 of one bridge arm. Tail ends of armature windings 7 of each phase are connected together. An electrical angle 360° of the permanent magnet brushless DC motor 4 is divided into a plurality of sectors. The controller determines the sectors corresponding to an N pole of a rotor 5 according to a rotating position of the rotor 5, and outputs a control signal in combination with the direction of the electromagnetic torque required by the permanent magnet brushless DC motor 4 to drive the corresponding controllable switch 2 to be turned on or off. When the permanent magnet brushless DC motor 4 is required to generate a counterclockwise rotation torque, the head ends of the n-phase armature windings under the N pole of the rotor 5 are simultaneously conducted with a positive pole of the DC power supply, and the head ends of the n'-phase armature windings 7 under an S pole of the rotor 5 are simultaneously conducted with a negative pole of the DC power supply. When the permanent magnet brushless DC motor 4 is required to generate a clockwise rotation torque, the head ends of the n-phase armature windings 7 under the N pole of the rotor 5 are simultaneously conducted with the negative pole of the DC power supply, the head ends of the n'-phase armature windings 7 under the S pole of the rotor 5 are simultaneously conducted with the positive pole of the DC power supply, and n+n'≤m. Wherein n+n' represents the number of phases in which the armature windings 7 are conducted at the same time, n+n' are all positive integers.

The armature windings of each phase of a multi-phase permanent magnet brushless DC motor are sequentially numbered 1, 2, 3 ..., 12 ..., m, in which the head ends of armature windings of each phase are sequentially numbered $A_1, A_2, A_3, \ldots, A_{12}, \ldots, A_m$, and the tail ends of armature windings of each phase are sequentially numbered $B_1, B_2, B_3, \ldots, B_{12} \ldots B_m$. Stator slots are sequentially numbered $G_1, G_2, G_3, \ldots, G_{12}, \ldots, G_{2m}$. The current flows from the outside to the head ends of armature windings 7 of a certain phase, i.e., the head ends of the armature windings 7 of this phase are conducted with the positive pole of the DC power supply. The current flows out from the head ends of the armature windings 7 of a certain phase, i.e., the head ends of the armature windings 7 of this phase are conducted with the negative pole of the DC power supply.

Figure 3:
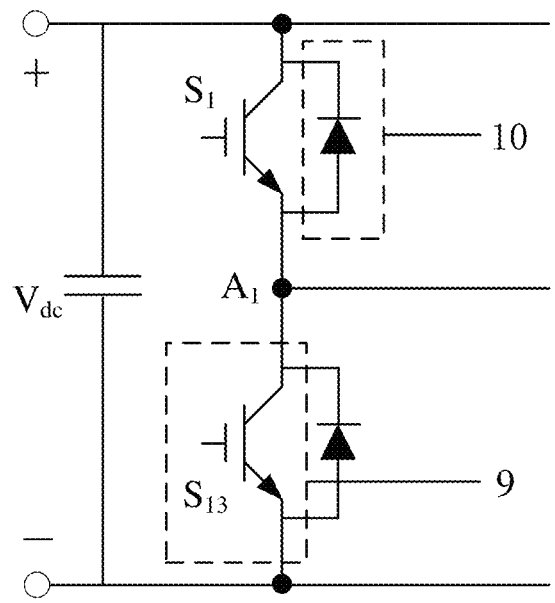
FIG. 3 is a connection diagram of a one-phase armature winding and a bridge arm according to the present invention.

The upper and lower controllable switches 2 are arranged on each bridge arm of a multi-bridge arm inverter. Each controllable switch 2 can be composed of a power switching device 9 and a freewheeling diode 10 connected with the power switching device 9 in parallel during implementation, as shown in FIG. 3. The inverter is a two-level voltage source inverter, which can be replaced with a three-level or multi-level voltage source inverter as required.

The control system of the flexible permanent magnet brushless DC motor according to the present invention further comprises a rotor position detection module or a rotor position estimation module. The permanent magnet brushless DC motor 4 can implement commutation through the controllable switches 2. Since the on-off state of the controllable switches 2 is determined by the position of the rotor 5, the rotating position of the rotor 5 should be detected real time. The rotor position information can be obtained by the rotor position detection module or the rotor position estimation module. The rotor position detection module comprises a rotor position sensor, which collects data of rotation angle of the rotor 5 and sends the collected data to the controller. The rotor position estimation module collects terminal voltage or data of phase current of each phase for calculation to obtain the data of rotation angle of the rotor 5, and sends the calculated data of rotor position to the controller.

Preferably, the armature windings 7 of the permanent magnet brushless DC motor 4 may be single-layer armature windings 7. It may be assumed that one of the armature windings 7 is numbered i, i=1, 2, ... m. When i<m, the head ends of $i^{th}$-phase armature windings 7 and the tail ends of $(i+1)^{th}$-phase armature windings 7 are alternately arranged in sequence along a circumferential direction. When m is an even number, the head ends of $m^{th}$-phase armature windings 7 are adjacent to the head ends of first-phase armature windings 7, and the tail ends of the $m^{th}$-phase armature windings 7 are adjacent to the tail ends of the first phase armature windings 7. When m is an odd number, the head ends of the $m^{th}$-phase armature windings 7 are adjacent to the tail ends of the first-phase armature windings 7, and the tail ends of the $m^{th}$-phase armature windings 7 are adjacent to the head ends of the first-phase armature windings 7. The armature windings of the permanent magnet brushless DC motor can be laid in a single-layer armature winding mode in the above method, or other armature winding laying modes, such as a double-layer or multi-layer armature winding laying mode.

Preferably, the permanent magnet brushless DC motor 4 may be a 12-phase permanent magnet brushless DC motor 4, i.e., m=12.

Preferably, the armature windings 7 of the permanent magnet brushless DC motor 4 may be hairpin armature windings, the armature windings 7 can be inserted into a semi-opened or closed slot. The neutral points are composed of copper end rings 6, and the tail ends of the armature windings 7 are connected to the end rings 6 in a way of wedge, mortise, tenon or welding.

Preferably, an air-gap magnetic density distribution waveform of the permanent magnet brushless DC motor 4 is a flat-top wave.

The present invention also provides a control method of a flexible permanent magnet brushless DC motor utilizing the control system of the flexible permanent magnet brushless DC motor. The permanent magnet brushless DC motor 4 is commutated once every 180°/m, and the electrical angle 360° is evenly divided into 2*m sectors. The current flows into the n-phase armature windings 7 and flows out of the n'-phase armature windings 7 during each commutation, n+n'≤m. The remaining armature windings 7 are suspended.

Preferably, the simultaneous conduction of n+n' phases can be adopted in the m-phase permanent magnet brushless DC motor 4, and n+n'≤m. In the case of few conducted phases, various phases are alternately conducted within one electrical cycle.

Preferably, a boundary line where a radial magnetic field between the N pole and the S pole of the permanent magnet brushless DC motor 4 is zero is taken as a physical center line, and it may be assumed that the armature winding 7 on the physical center line is numbered k. When armature windings 7 of one phase are suspended, $k^{th}$-phase armature windings 7 are suspended. When armature windings 7 of more than two phases are suspended, the $k^{th}$-phase armature windings 7 and the armature windings arranged on the left and right of the $k^{th}$-phase armature windings in sequence are suspended.

Preferably, in a constant-power operation state, a given reference rotating speed range is divided into a plurality of reference rotating speed intervals, the rotating speed is divided for the driving capacity of different conduction modes in the same way, the speed is regulated in each rotating speed interval through pulse width modulation, and the conduction modes are switched by a way of hysteresis ring at an edge of the interval. A comparison table for the reference rotating speed intervals, the phase number of the armature windings connected at the same time, and a hysteresis comparator are provided. The phase number of the armature windings conducted at the same time in the comparison table is sequentially decreased by one with the decrease of the reference rotating speed. A threshold of the hysteresis comparator is set. For each given reference rotating speed, the phase number of the armature windings 7 initially conducted at the same time is determined by the comparison table. When a difference between the reference rotating speed and the maximum speed in a current rotating speed interval is greater than the threshold, the phase number of the armature windings 7 conducted at the same time is increased by one. When the difference between the reference rotating speed and the minimum rotating speed of the current rotating speed interval in the table is smaller than the negative threshold, the phase number of the armature windings 7 connected at the same time is decreased by one.

Preferably, corresponding to each reference rotating speed interval, the DC power supply voltage can be modulated into a pulse voltage sequence with a constant frequency and a variable width, thereby the speed can be adjusted by adjusting the voltage.

The above-mentioned DC power supply, filter capacitor 1, controllable switches 2, controller, rotor position sensor, power switching device 9, freewheeling diode 10 and other components may be suitable products in the prior art. For example, the DC power supply may be an automotive DC power supply, a super capacitor, a high-capacity battery, etc. The power switching device 9 may be IGBT, MOSFET or other types of power switching devices. The controller may be selected from an industrial computer, a programmable controller, a digital signal processor (DSP), a field programmable gate array (FPGA), an advanced RISC machine (ARM) and other products in the prior art. The rotor position sensor may be a Hall sensor, an incremental rotor position sensor, a rotary encoder, etc.

Working principles of the present invention will be further explained below by a preferred embodiment of the present invention.

The control system of the flexible permanent magnet brushless DC motor 4 according to the present invention is composed of a multi-phase permanent magnet brushless DC motor 4 and a multi-bridge arm inverter 3, and is illustrated by taking m=12, i.e., a 12-phase permanent magnet brushless DC motor 4 as an example.

As shown in FIG. 1, the control system of the flexible permanent magnet brushless DC motor 4 according to the present invention is composed of a DC power supply, a filter capacitor 1, a two-level voltage source inverter 3 and a 12-phase permanent magnet brushless DC motor 4, in which the two-level voltage source inverter 3 is composed of 12 bridge arms. Each bridge arm is provided with upper and lower controllable switches 2, and is independently powered by one DC power supply. The armature windings of each phase are sequentially numbered 1, 2, 3 . . . , 12. Head ends of armature windings of each phase are sequentially numbered $A_1, A_2, A_3 \ldots, A_{12}$. Tail ends of armature windings of each phase are sequentially numbered $B_1, B_2, B_3 \ldots, B_{12}$. $A_1$-phase armature windings of the permanent magnet brushless DC motor 4 are connected to the first bridge arm, $A_2$-phase armature windings are connected to the second bridge arm, $A_3$-phase armature windings are connected to the third bridge arm, $A_4$-phase armature windings are connected to the fourth bridge arm, $A_5$-phase armature windings are connected to the fifth bridge arm, $A_6$-phase armature windings are connected to the sixth bridge arm, $A_7$-phase armature windings are connected to the seventh bridge arm, $A_8$-phase armature windings are connected to the eighth bridge arm, $A_9$ phase armature windings are connected to the ninth bridge arm, $A_{10}$-phase armature windings are connected to the tenth bridge arm, $A_{11}$-phase armature winding are connected to the eleventh bridge arm and $A_{12}$-phase armature windings are connected to the twelfth bridge arm. The tail ends of armature windings of each phase, such as $B_1, B_2, B_3, B_4, B_5, B_6, B_7, B_8, B_9, B_{10}, B_{11}$ and $B_{12}$, are connected together to form a neutral point of the permanent magnet brushless DC motor 4. An N pole and an S pole of a rotor excitation field of the 12-phase permanent magnet brushless DC motor 4 are as shown in FIG. 1. The armature windings 7 are arranged on a stator 8, and meanwhile, a Hall sensor may be arranged on the armature winding 7 of each phase. When the rotor 5 rotates to the corresponding position, the Hall sensor will send a signal to the controller.

Figure 4:
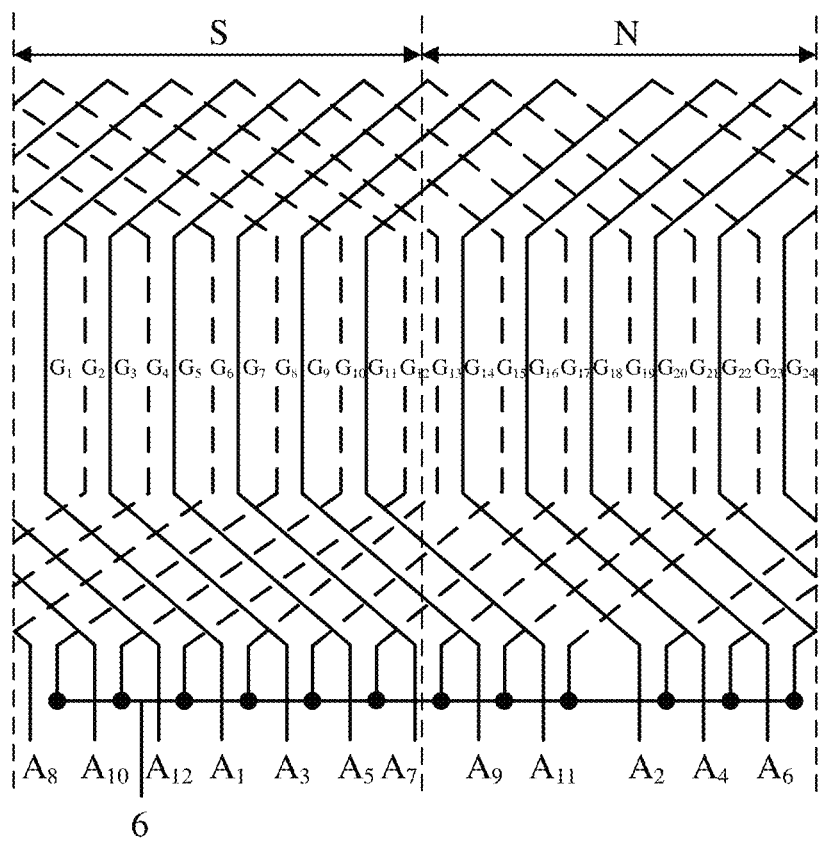
FIG. 4 is an expanded view of armature windings of a 12-phase permanent magnet brushless DC motor according to the present invention.

The head ends and the tail ends of the armature windings 7 of the 12-phase permanent magnet brushless DC motor 4 are alternately arranged. An expanded view of the armature winding is as shown in FIG. 4. A single layer of armature winding is placed in each slot. A total of 24 slots are located under a pair of poles. An air-gap magnetic field of the permanent magnet brushless DC motor 4 is designed as a flat-top wave with the maximum pole-arc coefficient. The control system of the flexible permanent magnet brushless DC motor 4 can select the number of conducted bridge arms of the inverter 3 as required. Taking the counterclockwise electromagnetic torque generated by a 11-phase conduction mode as an example, the conduction directions of the conducted 11-phase armature windings and each armature winding can be determined at any time according to the sector where the rotor 5 is located. When the current flows inward in conductors corresponding to the N poles of all rotors 5 and flows outward in the conductors corresponding to the S poles, all conducted armature windings will generate counterclockwise rotating electromagnetic torque on the rotors 5. A boundary line where the magnetic fields of the N pole and the S pole are zero is called a physical center line, and the armature winding 7 (such as $A_{12}$ armature winding in FIG. 1) corresponding to the physical center line is suspended. The armature windings of $A_1$-$A_{11}$ phases are controlled to be conducted at the positions of the rotors 5 shown in FIG. 1. When the rotor 5 rotates to a position where the physical center line is located between the armature windings of $A_{12}$ and $A_1$ phases, the rotor enters the next sector, $S_1$ is turned off and $S_{12}$ is turned on, and the phase is commutated to conduct the armature windings of $A_2$-$A_{12}$ phases. When the rotor 5 rotates to a position where the physical center line is located between the armature windings of $A_1$ and $B_2$ phases, the rotor enters the next sector again, $S_2$ is turned off and $S_{13}$ is turned on, and the phase is commutated to conduct the armature windings of $A_3$-$A_1$ phases. For a 12-phase permanent magnet brushless DC motor (m=12), the motor is commutated once every 180°/m=15°, and the electrical angle 360° is divided into 24 sectors. Twelve inverter bridge arms, with a total of 24 switching tubes, correspond to 2*m=24 11-phase conduction states. The conduction state corresponding to each sector is as shown in Table 1.

TABLE 1

Table for 11-phase conduction relations corresponding to counterclockwise electromagnetic torque

| Sector | Conducted controllable switches 2 (the remaining controllable switches 2 are turned off) | Conducted phases (+ indicates that the phase is connected to the positive pole of the power supply; and − indicates that the phase is connected to the negative pole of the power supply.) |
|---|---|---|
| 0°-15° | $S_1$, $S_2$, $S_3$, $S_4$, $S_5$, $S_6$, $S_7$, $S_8$, $S_9$, $S_{10}$, $S_{11}$ | $A_{1+}$, $A_{2-}$, $A_{3+}$, $A_{4-}$, $A_{5+}$, $A_{6-}$, $A_{7+}$, $A_{8-}$, $A_{9+}$, $A_{10-}$, $A_{11+}$ |
| 15°-30° | $S_2$, $S_3$, $S_4$, $S_5$, $S_6$, $S_7$, $S_8$, $S_9$, $S_{10}$, $S_{11}$, $S_{12}$ | $A_{2-}$, $A_{3+}$, $A_{4-}$, $A_{5+}$, $A_{6-}$, $A_{7+}$, $A_{8-}$, $A_{9+}$, $A_{10-}$, $A_{11+}$, $A_{12-}$ |
| 30°-45° | $S_3$, $S_4$, $S_5$, $S_6$, $S_7$, $S_8$, $S_9$, $S_{10}$, $S_{11}$, $S_{12}$, $S_{13}$ | $A_{3+}$, $A_{4-}$, $A_{5+}$, $A_{6-}$, $A_{7+}$, $A_{8-}$, $A_{9+}$, $A_{10-}$, $A_{11+}$, $A_{12-}$, $A_{1-}$ |
| 45°-60° | $S_4$, $S_5$, $S_6$, $S_7$, $S_8$, $S_9$, $S_{10}$, $S_{11}$, $S_{12}$, $S_{13}$, $S_{14}$ | $A_{4-}$, $A_{5+}$, $A_{6-}$, $A_{7+}$, $A_{8-}$, $A_{9+}$, $A_{10-}$, $A_{11+}$, $A_{12-}$, $A_{1-}$, $A_{2+}$ |
| 60°-75° | $S_5$, $S_6$, $S_7$, $S_8$, $S_9$, $S_{10}$, $S_{11}$, $S_{12}$, $S_{13}$, $S_{14}$, $S_{15}$ | $A_{5+}$, $A_{6-}$, $A_{7+}$, $A_{8-}$, $A_{9+}$, $A_{10-}$, $A_{11+}$, $A_{12-}$, $A_{1-}$, $A_{2+}$, $A_{3-}$ |
| 75°-90° | $S_6$, $S_7$, $S_8$, $S_9$, $S_{10}$, $S_{11}$, $S_{12}$, $S_{13}$, $S_{14}$, $S_{15}$, $S_{16}$ | $A_{6-}$, $A_{7+}$, $A_{8-}$, $A_{9+}$, $A_{10-}$, $A_{11+}$, $A_{12-}$, $A_{1-}$, $A_{2+}$, $A_{3-}$, $A_{4+}$ |
| 90°-105° | $S_7$, $S_8$, $S_9$, $S_{10}$, $S_{11}$, $S_{12}$, $S_{13}$, $S_{14}$, $S_{15}$, $S_{16}$, $S_{17}$ | $A_{7+}$, $A_{8-}$, $A_{9+}$, $A_{10-}$, $A_{11+}$, $A_{12-}$, $A_{1-}$, $A_{2+}$, $A_{3-}$, $A_{4+}$, $A_{5-}$ |
| 105°-120° | $S_8$, $S_9$, $S_{10}$, $S_{11}$, $S_{12}$, $S_{13}$, $S_{14}$, $S_{15}$, $S_{16}$, $S_{17}$, $S_{18}$ | $A_{8-}$, $A_{9+}$, $A_{10-}$, $A_{11+}$, $A_{12-}$, $A_{1-}$, $A_{2+}$, $A_{3-}$, $A_{4+}$, $A_{5-}$, $A_{6+}$ |
| 120°-135° | $S_9$, $S_{10}$, $S_{11}$, $S_{12}$, $S_{13}$, $S_{14}$, $S_{15}$, $S_{16}$, $S_{17}$, $S_{18}$, $S_{19}$ | $A_{9+}$, $A_{10-}$, $A_{11+}$, $A_{12-}$, $A_{1-}$, $A_{2+}$, $A_{3-}$, $A_{4+}$, $A_{5-}$, $A_{6+}$, $A_{7-}$ |
| 135°-150° | $S_{10}$, $S_{11}$, $S_{12}$, $S_{13}$, $S_{14}$, $S_{15}$, $S_{16}$, $S_{17}$, $S_{18}$, $S_{19}$, $S_{20}$ | $A_{10-}$, $A_{11+}$, $A_{12-}$, $A_{1-}$, $A_{2+}$, $A_{3-}$, $A_{4+}$, $A_{5-}$, $A_{6+}$, $A_{7-}$, $A_{8+}$ |
| 150°-165° | $S_{11}$, $S_{12}$, $S_{13}$, $S_{14}$, $S_{15}$, $S_{16}$, $S_{17}$, $S_{18}$, $S_{19}$, $S_{20}$, $S_{21}$ | $A_{11+}$, $A_{12-}$, $A_{1-}$, $A_{2+}$, $A_{3-}$, $A_{4+}$, $A_{5-}$, $A_{6+}$, $A_{7-}$, $A_{8+}$, $A_{9-}$ |
| 165°-180° | $S_{12}$, $S_{13}$, $S_{14}$, $S_{15}$, $S_{16}$, $S_{17}$, $S_{18}$, $S_{19}$, $S_{20}$, $S_{21}$, $S_{22}$ | $A_{12-}$, $A_{1-}$, $A_{2+}$, $A_{3-}$, $A_{4+}$, $A_{5-}$, $A_{6+}$, $A_{7-}$, $A_{8+}$, $A_{9-}$, $A_{10+}$ |
| 180°-195° | $S_{13}$, $S_{14}$, $S_{15}$, $S_{16}$, $S_{17}$, $S_{18}$, $S_{19}$, $S_{20}$, $S_{21}$, $S_{22}$, $S_{23}$ | $A_{1-}$, $A_{2+}$, $A_{3-}$, $A_{4+}$, $A_{5-}$, $A_{6+}$, $A_{7-}$, $A_{8+}$, $A_{9-}$, $A_{10+}$, $A_{11-}$ |
| 195°-210° | $S_{14}$, $S_{15}$, $S_{16}$, $S_{17}$, $S_{18}$, $S_{19}$, $S_{20}$, $S_{21}$, $S_{22}$, $S_{23}$, $S_{24}$ | $A_{2+}$, $A_{3-}$, $A_{4+}$, $A_{5-}$, $A_{6+}$, $A_{7-}$, $A_{8+}$, $A_{9-}$, $A_{10+}$, $A_{11-}$, $A_{12+}$ |
| 210°-225° | $S_{15}$, $S_{16}$, $S_{17}$, $S_{18}$, $S_{19}$, $S_{20}$, $S_{21}$, $S_{22}$, $S_{23}$, $S_{24}$, $S_1$ | $A_{3-}$, $A_{4+}$, $A_{5-}$, $A_{6+}$, $A_{7-}$, $A_{8+}$, $A_{9-}$, $A_{10+}$, $A_{11-}$, $A_{12+}$, $A_{1+}$ |
| 225°-240° | $S_{16}$, $S_{17}$, $S_{18}$, $S_{19}$, $S_{20}$, $S_{21}$, $S_{22}$, $S_{23}$, $S_{24}$, $S_1$, $S_2$ | $A_{4+}$, $A_{5-}$, $A_{6+}$, $A_{7-}$, $A_{8+}$, $A_{9-}$, $A_{10+}$, $A_{11-}$, $A_{12+}$, $A_{1+}$, $A_{2-}$ |
| 240°-255° | $S_{17}$, $S_{18}$, $S_{19}$, $S_{20}$, $S_{21}$, $S_{22}$, $S_{23}$, $S_{24}$, $S_1$, $S_2$, $S_3$ | $A_{5-}$, $A_{6+}$, $A_{7-}$, $A_{8+}$, $A_{9-}$, $A_{10+}$, $A_{11-}$, $A_{12+}$, $A_{1+}$, $A_{2-}$, $A_{3+}$ |
| 255°-270° | $S_{18}$, $S_{19}$, $S_{20}$, $S_{21}$, $S_{22}$, $S_{23}$, $S_{24}$, $S_1$, $S_2$, $S_3$, $S_4$ | $A_{6+}$, $A_{7-}$, $A_{8+}$, $A_{9-}$, $A_{10+}$, $A_{11-}$, $A_{12+}$, $A_{1+}$, $A_{2-}$, $A_{3+}$, $A_{4-}$ |
| 270°-285° | $S_{19}$, $S_{20}$, $S_{21}$, $S_{22}$, $S_{23}$, $S_{24}$, $S_1$, $S_2$, $S_3$, $S_4$, $S_5$ | $A_{7-}$, $A_{8+}$, $A_{9-}$, $A_{10+}$, $A_{11-}$, $A_{12+}$, $A_{1+}$, $A_{2-}$, $A_{3+}$, $A_{4-}$, $A_{5+}$ |
| 285°-300° | $S_{20}$, $S_{21}$, $S_{22}$, $S_{23}$, $S_{24}$, $S_1$, $S_2$, $S_3$, $S_4$, $S_5$, $S_6$ | $A_{8+}$, $A_{9-}$, $A_{10+}$, $A_{11-}$, $A_{12+}$, $A_{1+}$, $A_{2-}$, $A_{3+}$, $A_{4-}$, $A_{5+}$, $A_{6-}$ |
| 300°-315° | $S_{21}$, $S_{22}$, $S_{23}$, $S_{24}$, $S_1$, $S_2$, $S_3$, $S_4$, $S_5$, $S_6$, $S_7$ | $A_{9-}$, $A_{10+}$, $A_{11-}$, $A_{12+}$, $A_{1+}$, $A_{2-}$, $A_{3+}$, $A_{4-}$, $A_{5+}$, $A_{6-}$, $A_{7+}$ |
| 315°-330° | $S_{22}$, $S_{23}$, $S_{24}$, $S_1$, $S_2$, $S_3$, $S_4$, $S_5$, $S_6$, $S_7$, $S_8$ | $A_{10+}$, $A_{11-}$, $A_{12+}$, $A_{1+}$, $A_{2-}$, $A_{3+}$, $A_{4-}$, $A_{5+}$, $A_{6-}$, $A_{7+}$, $A_{8-}$ |
| 330°-345° | $S_{23}$, $S_{24}$, $S_1$, $S_2$, $S_3$, $S_4$, $S_5$, $S_6$, $S_7$, $S_8$, $S_9$ | $A_{11-}$, $A_{12+}$, $A_{1+}$, $A_{2-}$, $A_{3+}$, $A_{4-}$, $A_{5+}$, $A_{6-}$, $A_{7+}$, $A_{8-}$, $A_{9+}$ |
| 345°-360° | $S_{24}$, $S_1$, $S_2$, $S_3$, $S_4$, $S_5$, $S_6$, $S_7$, $S_8$, $S_9$, $S_{10}$ | $A_{12+}$, $A_{1+}$, $A_{2-}$, $A_{3+}$, $A_{4-}$ $A_{5+}$, $A_{6-}$, $A_{7+}$, $A_{8-}$, $A_{9+}$, $A_{10-}$ |

Table 1 shows that the armature windings of each phase are subjected to positive conduction 165° and negative conduction 165° in an electrical cycle. Each commutation is performed between two phases, while the states of the remaining 10-phase armature windings are unchanged.

When the clockwise electromagnetic torque needs to be generated, the current in the conductors corresponding to the N poles of all rotors 5 can be controlled to flow outward, the current in the conductors corresponding to the S poles can be controlled to flow inward, and the armature winding 7 corresponding to the physical center line can be suspended. In this way, all conducted armature windings will generate clockwise rotating electromagnetic torque on the rotors 5. When the 12-phase permanent magnet brushless DC motor 4 is controlled to generate clockwise electromagnetic torque, the correspondences of 24 sectors and 24 11-phase conduction states are as shown in Table 2.

TABLE 2

Table for 11-phase conduction relations corresponding to clockwise electromagnetic torque

| Sector | Conducted controllable switches 2 (the remaining controllable switches 2 are turned off) | Conducted phases (+ indicates that the phase is connected to the positive pole of the power supply; and − indicates that the phase is connected to the negative pole of the power supply.) |
|---|---|---|
| 0°-15° | $S_{13}, S_{14}, S_{15}, S_{16}, S_{17}, S_{18}, S_{19}, S_{20}, S_{21}, S_{22}, S_{23}$ | $A_{1-}, A_{2+}, A_{3-}, A_{4+}, A_{5-}, A_{6+}, A_{7-}, A_{8+}, A_{9-}, A_{10+}, A_{11-}$ |
| 15°-30° | $S_{14}, S_{15}, S_{16}, S_{17}, S_{18}, S_{19}, S_{20}, S_{21}, S_{22}, S_{23}, S_{24}$ | $A_{2+}, A_{3-}, A_{4+}, A_{5-}, A_{6+}, A_{7-}, A_{8+}, A_{9-}, A_{10+}, A_{11-}, A_{12+}$ |
| 30°-45° | $S_{15}, S_{16}, S_{17}, S_{18}, S_{19}, S_{20}, S_{21}, S_{22}, S_{23}, S_{24}, S_{1}$ | $A_{3-}, A_{4+}, A_{5-}, A_{6+}, A_{7-}, A_{8+}, A_{9-}, A_{10+}, A_{11-}, A_{12+}, A_{1+}$ |
| 45°-60° | $S_{16}, S_{17}, S_{18}, S_{19}, S_{20}, S_{21}, S_{22}, S_{23}, S_{24}, S_{1}, S_{2}$ | $A_{4+}, A_{5-}, A_{6+}, A_{7-}, A_{8+}, A_{9-}, A_{10+}, A_{11-}, A_{12+}, A_{1+}, A_{2-}$ |
| 60°-75° | $S_{17}, S_{18}, S_{19}, S_{20}, S_{21}, S_{22}, S_{23}, S_{24}, S_{1}, S_{2}, S_{3}$ | $A_{5-}, A_{6+}, A_{7-}, A_{8+}, A_{9-}, A_{10+}, A_{11-}, A_{12+}, A_{1+}, A_{2-}, A_{3+}$ |
| 75°-90° | $S_{18}, S_{19}, S_{20}, S_{21}, S_{22}, S_{23}, S_{24}, S_{1}, S_{2}, S_{3}, S_{4}$ | $A_{6+}, A_{7-}, A_{8+}, A_{9-}, A_{10+}, A_{11-}, A_{12+}, A_{1+}, A_{2-}, A_{3+}, A_{4-}$ |
| 90°-105° | $S_{19}, S_{20}, S_{21}, S_{22}, S_{23}, S_{24}, S_{1}, S_{2}, S_{3}, S_{4}, S_{5}$ | $A_{7-}, A_{8+}, A_{9-}, A_{10+}, A_{11-}, A_{12+}, A_{1+}, A_{2-}, A_{3+}, A_{4-}, A_{5+}$ |
| 105°-120° | $S_{20}, S_{21}, S_{22}, S_{23}, S_{24}, S_{1}, S_{2}, S_{3}, S_{4}, S_{5}, S_{6}$ | $A_{8+}, A_{9-}, A_{10+}, A_{11-}, A_{12+}, A_{1+}, A_{2-}, A_{3+}, A_{4-}, A_{5+}, A_{6-}$ |
| 120°-135° | $S_{21}, S_{22}, S_{23}, S_{24}, S_{1}, S_{2}, S_{3}, S_{4}, S_{5}, S_{6}, S_{7}$ | $A_{9-}, A_{10+}, A_{11-}, A_{12+}, A_{1+}, A_{2-}, A_{3+}, A_{4-}, A_{5+}, A_{6-}, A_{7+}$ |
| 135°-150° | $S_{22}, S_{23}, S_{24}, S_{1}, S_{2}, S_{3}, S_{4}, S_{5}, S_{6}, S_{7}, S_{8}$ | $A_{10+}, A_{11-}, A_{12+}, A_{1+}, A_{2-}, A_{3+}, A_{4-}, A_{5+}, A_{6-}, A_{7+}, A_{8-}$ |
| 150°-165° | $S_{23}, S_{24}, S_{1}, S_{2}, S_{3}, S_{4}, S_{5}, S_{6}, S_{7}, S_{8}, S_{9}$ | $A_{11-}, A_{12+}, A_{1+}, A_{2-}, A_{3+}, A_{4-}, A_{5+}, A_{6-}, A_{7+}, A_{8-}, A_{9+}$ |
| 165°-180° | $S_{24}, S_{1}, S_{2}, S_{3}, S_{4}, S_{5}, S_{6}, S_{7}, S_{8}, S_{9}, S_{10}$ | $A_{12+}, A_{1+}, A_{2-}, A_{3+}, A_{4-}, A_{5+}, A_{6-}, A_{7+}, A_{8-}, A_{9+}, A_{10-}$ |
| 180°-195° | $S_{1}, S_{2}, S_{3}, S_{4}, S_{5}, S_{6}, S_{7}, S_{8}, S_{9}, S_{10}, S_{11}$ | $A_{1+}, A_{2-}, A_{3+}, A_{4-}, A_{5+}, A_{6-}, A_{7+}, A_{8-}, A_{9+}, A_{10-}, A_{11+}$ |
| 195°-210° | $S_{2}, S_{3}, S_{4}, S_{5}, S_{6}, S_{7}, S_{8}, S_{9}, S_{10}, S_{11}, S_{12}$ | $A_{2-}, A_{3+}, A_{4-}, A_{5+}, A_{6-}, A_{7+}, A_{8-}, A_{9+}, A_{10-}, A_{11+}, A_{12-}$ |
| 210°-225° | $S_{3}, S_{4}, S_{5}, S_{6}, S_{7}, S_{8}, S_{9}, S_{10}, S_{11}, S_{12}, S_{13}$ | $A_{3+}, A_{4-}, A_{5+}, A_{6-}, A_{7+}, A_{8-}, A_{9+}, A_{10-}, A_{11+}, A_{12-}, A_{1-}$ |
| 225°-240° | $S_{4}, S_{5}, S_{6}, S_{7}, S_{8}, S_{9}, S_{10}, S_{11}, S_{12}, S_{13}, S_{14}$ | $A_{4-}, A_{5+}, A_{6-}, A_{7+}, A_{8-}, A_{9+}, A_{10-}, A_{11+}, A_{12-}, A_{1-}, A_{2+}$ |
| 240°-255° | $S_{5}, S_{6}, S_{7}, S_{8}, S_{9}, S_{10}, S_{11}, S_{12}, S_{13}, S_{14}, S_{15}$ | $A_{5+}, A_{6-}, A_{7+}, A_{8-}, A_{9+}, A_{10-}, A_{11+}, A_{12-}, A_{1-}, A_{2+}, A_{3-}$ |
| 255°-270° | $S_{6}, S_{7}, S_{8}, S_{9}, S_{10}, S_{11}, S_{12}, S_{13}, S_{14}, S_{15}, S_{16}$ | $A_{6-}, A_{7+}, A_{8-}, A_{9+}, A_{10-}, A_{11+}, A_{12-}, A_{1-}, A_{2+}, A_{3-}, A_{4+}$ |
| 270°-285° | $S_{7}, S_{8}, S_{9}, S_{10}, S_{11}, S_{12}, S_{13}, S_{14}, S_{15}, S_{16}, S_{17}$ | $A_{7+}, A_{8-}, A_{9+}, A_{10-}, A_{11+}, A_{12-}, A_{1-}, A_{2+}, A_{3-}, A_{4+}, A_{5-}$ |
| 285°-300° | $S_{8}, S_{9}, S_{10}, S_{11}, S_{12}, S_{13}, S_{14}, S_{15}, S_{16}, S_{17}, S_{18}$ | $A_{8-}, A_{9+}, A_{10-}, A_{11+}, A_{12-}, A_{1-}, A_{2+}, A_{3-}, A_{4+}, A_{5-}, A_{6+}$ |
| 300°-315° | $S_{9}, S_{10}, S_{11}, S_{12}, S_{13}, S_{14}, S_{15}, S_{16}, S_{17}, S_{18}, S_{19}$ | $A_{9+}, A_{10-}, A_{11+}, A_{12-}, A_{1-}, A_{2+}, A_{3-}, A_{4+}, A_{5-}, A_{6+}, A_{7-}$ |
| 315°-330° | $S_{10}, S_{11}, S_{12}, S_{13}, S_{14}, S_{15}, S_{16}, S_{17}, S_{18}, S_{19}, S_{20}$ | $A_{10-}, A_{11+}, A_{12-}, A_{1-}, A_{2+}, A_{3-}, A_{4+}, A_{5-}, A_{6+}, A_{7-}, A_{8+}$ |
| 330°-345° | $S_{11}, S_{12}, S_{13}, S_{14}, S_{15}, S_{16}, S_{17}, S_{18}, S_{19}, S_{20}, S_{21}$ | $A_{11+}, A_{12-}, A_{1-}, A_{2+}, A_{3-}, A_{4+}, A_{5-}, A_{6+}, A_{7-}, A_{8+}, A_{9-}$ |
| 345°-360° | $S_{12}, S_{13}, S_{14}, S_{15}, S_{16}, S_{17}, S_{18}, S_{19}, S_{20}, S_{21}, S_{22}$ | $A_{12-}, A_{1-}, A_{2+}, A_{3-}, A_{4+}, A_{5}, A_{6+}, A_{7-}, A_{8+}, A_{9-}, A_{10+}$ |

When the counterclockwise rotating electromagnetic torque is required to control the two-phase conduction of the motor, the correspondences of 24 sectors and 24 two-phase conduction states are as shown in Table 3.

TABLE 3

Table for two-phase conduction relations corresponding to counterclockwise electromagnetic torque

| Sector | Conducted controllable switches 2 (the remaining controllable switches 2 are turned off) | Conducted phases (+ indicates that the phase is connected to the positive pole of the power supply; and − indicates that the phase is connected to the negative pole of the power supply.) |
|---|---|---|
| 0°-15° | $S_5, S_6$ | $A_{5+}, A_{6-}$ |
| 15°-30° | $S_6, S_7$ | $A_{6-}, A_{7+}$ |
| 30°-45° | $S_7, S_8$ | $A_{7+}, A_{8-}$ |
| 45°-60° | $S_8, S_9$ | $A_{8-}, A_{9+}$ |
| 60°-75° | $S_9, S_{10}$ | $A_{9+}, A_{10-}$ |
| 75°-90° | $S_{10}, S_{11}$ | $A_{10-}, A_{11+}$ |
| 90°-105° | $S_{11}, S_{12}$ | $A_{11+}, A_{12-}$ |
| 105°-120° | $S_{12}, S_{13}$ | $A_{12-}, A_{1-}$ |
| 120°-135° | $S_{13}, S_{14}$ | $A_{1-}, A_{2+}$ |
| 135°-150° | $S_{14}, S_{15}$ | $A_{2+}, A_{3-}$ |
| 150°-165° | $S_{15}, S_{16}$ | $A_{3-}, A_{4+}$ |
| 165°-180° | $S_{16}, S_{17}$ | $A_{4+}, A_{5-}$ |
| 180°-195° | $S_{17}, S_{18}$ | $A_{5-}, A_{6+}$ |
| 195°-210° | $S_{18}, S_{19}$ | $A_{6+}, A_{7-}$ |
| 210°-225° | $S_{19}, S_{20}$ | $A_{7-}, A_{8+}$ |
| 225°-240° | $S_{20}, S_{21}$ | $A_{8+}, A_{9-}$ |
| 240°-255° | $S_{21}, S_{22}$ | $A_{9-}, A_{10+}$ |
| 255°-270° | $S_{22}, S_{23}$ | $A_{10+}, A_{11-}$ |
| 270°-285° | $S_{23}, S_{24}$ | $A_{11-}, A_{12+}$ |
| 285°-300° | $S_{24}, S_{1}$ | $A_{12+}, A_{1+}$ |
| 300°-315° | $S_{1}, S_{2}$ | $A_{1+}, A_{2-}$ |
| 315°-330° | $S_{2}, S_{3}$ | $A_{2-}, A_{3+}$ |
| 330°-345° | $S_{3}, S_{4}$ | $A_{3+}, A_{4-}$ |
| 345°-360° | $S_{4}, S_{5}$ | $A_{4-}, A_{5+}$ |

The permanent magnet brushless DC motor 4 performs commutation through the controllable switches 2, and the on-off state of the controllable switches 2 is determined by the position of the rotor 5, so the position of the rotor 5 should be detected in real time. Two methods for detecting the position comprise a position sensor detection method and a position sensorless detection method. The former obtains the position information of the rotor 5 by a position sensor, while the latter demodulates the position information of the rotor 5 through a functional relationship between a terminal voltage or phase current of each phase of the permanent magnet brushless DC motor 4 and a position angle of the rotor 5.

Figure 5:
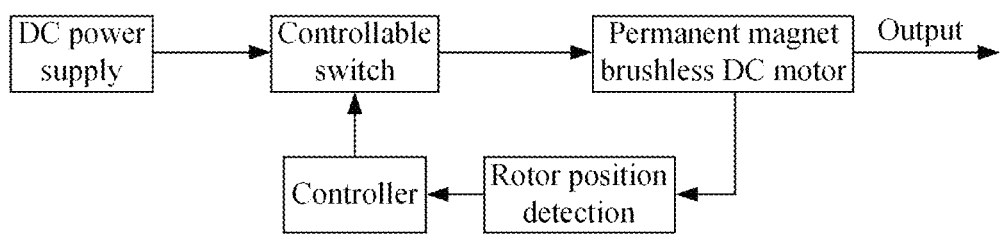
FIG. 5 is a control block diagram of a system for a flexible permanent magnet brushless DC motor according to the present invention.

Taking the rotation direction of counterclockwise electromagnetic torque as an example, when the position of the rotor 5 is detected to be in a first sector) (0°-15°), the controllable switches $S_1$, $S_2$, $S_3$, $S_4$, $S_5$, $S_6$, $S_7$, $S_8$, $S_9$, $S_{10}$ and $S_{11}$ are turned on at this moment. The rotor 5 rotates into the next sector, the position sensor converts a position signal of the rotor 5 into an electrical signal and sends the signal to the controller. As shown in FIG. 5, the controller calculates a conduction logic signal of the armature windings of each phase of a stator 8. A continuous rotating magnetic field will be synthesized in the air gap of the permanent magnet brushless DC motor 4 according to the conduction relations shown in Table 1, so that the rotor 5 of the permanent magnet brushless DC motor 4 can rotate continuously.

The control system of the flexible permanent magnet brushless DC motor 4 according to the present invention can select the number of conducted bridge arms of the inverter 3 and the number of conducted phases of the permanent magnet brushless DC motor 4 according to the requirements of driving systems in different application occasions. It can divide the rotating speed according to the driving capacity of different conduction modes, and realizes hierarchical speed regulation in each interval by combining with pulse width modulation. The situations of rotating speed intervals are as shown in Table 4. When the rotating speed is greater than 20,000 rpm, the inverter 3 should be used to control the conduction of the 11-phase armature windings of the permanent magnet brushless DC motor 4, and the controllable switches of eleven bridge arms of the inverter 3 will act at this moment. When the rotating speed is between 20,000 rpm and 18,000 rpm, the inverter 3 should be used to control the conduction of the 10-phase armature windings of the permanent magnet brushless DC motor 4, and the controllable switches of ten bridge arms of the inverter 3 will act at this moment. When the rotating speed is between 18,000 rpm and 16,000 rpm, the inverter 3 should be used to control the conduction of the 9-phase armature windings of the permanent magnet brushless DC motor 4, and the controllable switches of nine bridge arms of the inverter 3 will act at this moment. When the rotating speed is between 16,000 rpm and 14,000 rpm, the inverter 3 should be used to control the conduction of the 8-phase armature windings of the permanent magnet brushless DC motor 4, and the controllable switches of eight bridge arms of the inverter 3 will act at this moment. When the rotating speed is between 14,000 rpm and 12,000 rpm, the inverter 3 should be used to control the conduction of the 7-phase armature windings of the permanent magnet brushless DC motor 4, and the controllable switches of seven bridge arms of the inverter 3 will act at this moment. When the rotating speed is between 12,000 rpm and 10,000 rpm, the inverter 3 should be used to control the conduction of the 6-phase armature windings of the permanent magnet brushless DC motor 4, and the controllable switches of six bridge arms of the inverter 3 will act at this moment. When the rotating speed is between 10,000 rpm and 8,000 rpm, the inverter 3 should be used to control the conduction of the 5-phase armature windings of the permanent magnet brushless DC motor 4, and the controllable switches of five bridge arms of the inverter 3 will act at this moment. When the rotating speed is between 8,000 rpm and 6,000 rpm, the inverter 3 should be used to control the conduction of the 4-phase armature windings of the permanent magnet brushless DC motor 4, and the controllable switches of four bridge arms of the inverter 3 will act at this moment. When the rotating speed is between 6,000 rpm and 4,000 rpm, the inverter 3 should be used to control the conduction of the 3-phase armature windings of the permanent magnet brushless DC motor 4, and the controllable switches of three bridge arms of the inverter 3 will act at this moment. When the rotating speed is less than 4,000 rpm, the inverter 3 should be used to control the conduction of the 2-phase armature windings of the permanent magnet brushless DC motor 4, and the controllable switches of two bridge arms of the inverter 3 will act at this moment. The rotating speed of the permanent magnet brushless DC motor 4 can be regulated in different conduction modes according to such a conduction rule.

TABLE 4

Comparison table for the reference rotating speed intervals and the phase number of armature windings conducted at the same time

| | Conduction mode | | | | |
|---|---|---|---|---|---|
| | 11-phase conduction | 10-phase conduction | 9-phase conduction | 8-phase conduction | 7-phase conduction |
| Rotating speed range | Above 20000 rpm | 18000 rpm-20000 rpm | 16000 rpm-18000 rpm | 14000 rpm-16000 rpm | 12000 rpm-14000 rpm |
| | Conduction mode | | | | |
| | 6-phase conduction | 5-phase conduction | 4-phase conduction | 3-phase conduction | 2-phase conduction |
| Rotating speed range | 10000 rpm-12000 rpm | 8000 rpm-10000 rpm | 6000 rpm-8000 rpm | 4000 rpm-6000 rpm | Below 4,000 rpm |

In different rotating speed intervals, the rotating speed of permanent magnet brushless DC motor 4 is regulated by pulse width modulation (PWM). The method using PWM modulation can be adopted to modulate a constant DC source voltage into a pulse voltage sequence with a constant frequency and variable width. In an on-off cycle (T), when $0 \leq t < t_{on}$, a high level is outputted, the controllable switches are turned on, and the power supply voltage is applied to both ends of the armature windings 7 of the permanent magnet brushless DC motor 4. When $t_{on} \leq t < T$, a low level is outputted, the controllable switches are turned off, and the current of the armature windings is freewheeled by diodes due to the loss of power supply at both ends of the armature windings 7. The average voltage obtained at both ends of the armature windings 7 of the permanent magnet brushless DC motor 4 is $$V = \frac{t_{on}}{T} V_{dc} = \alpha V_{dc},$$

in which $\alpha = t_{on}/T$ refers to a duty ratio of PWM waveform. The outputted average voltage can be changed by changing $\alpha$, thereby regulating the rotating speed of the permanent magnet brushless DC motor 4 in the corresponding rotating speed interval range.

Figure 6:
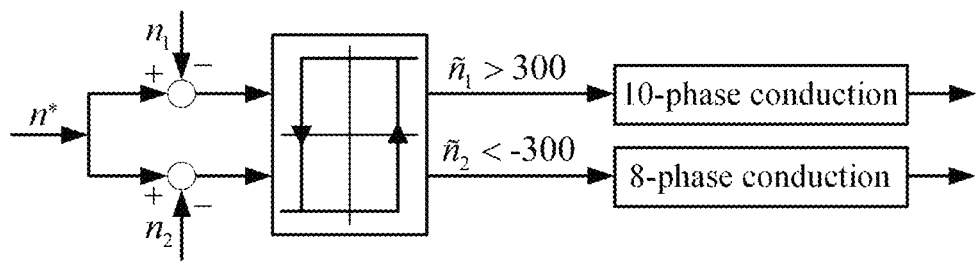
FIG. 6 is a schematic diagram of a hysteresis ring switching mode of rotating speed intervals of a 12-phase permanent magnet brushless DC motor according to the present invention.

The initial conduction mode is determined by the initial reference rotating speed lookup table 4. When the reference rotating speed changes, a way of hysteresis ring is used at the edges of the rotating speed sectors to determine the control mode of which sector is adopted. As shown in FIG. 6, the given reference rotating speed is represented by n*, an upper limit of the current rotating speed interval is represented by $n_1$, a lower limit of the current rotating speed interval is represented by $n_2$, a difference between reference rotating speed and the upper limit of the rotating speed interval is represented by $ñ_1$, and a difference between the reference rotating speed and the lower limit of the rotating speed interval is represented by $ñ_2$.

When the permanent magnet brushless DC motor 4 operates in the rotating speed interval of 16,000 rpm-18,000 rpm, the motor is controlled by 9-phase conduction, and the reference rotating speed is compared with the upper and lower limits of the rotating speed interval by a hysteresis comparator. When the reference rotating speed of the permanent magnet brushless DC motor 4 exceeds 18,300 rpm, i.e., the difference between the rotating speeds is $\tilde{n}_1 = n^* - n_1 > 300$ rpm, the motor is controlled by 10-phase conduction. When the reference rotating speed of the permanent magnet brushless DC motor 4 is less than 15,700 rpm, i.e., the difference between the rotating speeds is $\tilde{n}_2 = n^* - n_2 < -300$ rpm, the motor is controlled by 8-phase conduction. As long as the stator armature windings 7 can still form a circular rotating magnetic field by adjusting the stator 8 current in the permanent magnet brushless DC motor 4 in different intervals, the stable operation of the permanent magnet brushless DC motor 4 can be ensured.

The 12-phase permanent magnet brushless DC motor 4 according to the present invention can cooperate with the 12-bridge arm inverter 3 to meet requirements of the driving system of a high-performance permanent magnet brushless DC motor 4. The multi-phase permanent magnet brushless DC motor 4 with high power density can significantly improve the utilization rate of the armature windings and reduce the torque fluctuation under flexible control. The present invention has important theoretical reference value for the application of high-performance electric vehicle driving systems.

The aforementioned embodiment is merely used to illustrate the technical ideas and features of the present invention, to enable those skilled in the technical field to understand the content of the present invention and implement the present invention accordingly. The patent scope of the present invention is not limited by the above embodiment. That is, any equivalent changes or modifications to the spirit disclosed in the present invention still fall into the patent scope of the present invention.

What is claimed is:

1. A control system of a flexible permanent magnet brushless DC motor, comprising a DC power supply, a filter capacitor, a voltage source inverter, a permanent magnet brushless DC motor and a controller, wherein the output end of the DC power supply is connected with the filter capacitor in parallel; the voltage source inverter is provided with m bridge arms which are connected with both ends of the filter capacitor in parallel; upper and lower controllable switches are arranged on each bridge arm; the phase number of armature winding of the permanent magnet brushless DC motor is equal to the number of bridge arms; head ends of armature windings of each phase are correspondingly connected with intermediate contacts of the upper controllable switch and the lower controllable switch of one bridge arm, tail ends of armature windings of each phase are connected together; an electrical angle 360° of the permanent magnet brushless DC motor is divided into a plurality of sectors; the controller determines the sectors corresponding to an N pole of a rotor according to the position of the rotor, and outputs a control signal in combination with the direction of the electromagnetic torque required by the motor to drive the corresponding controllable switch to be turned on or off; when the permanent magnet brushless DC motor is required to generate a counterclockwise rotation torque, the head ends of a n-phase armature windings under the N pole of the rotor are simultaneously conducted with a positive pole of the DC power supply, and the head ends of a n'-phase armature windings under a S pole of the rotor are simultaneously conducted with a negative pole of the DC power supply; when the permanent magnet brushless DC motor is required to generate a clockwise rotation torque, the head ends of the n-phase armature windings under the N pole of the rotor are simultaneously conducted with the negative pole of the DC power supply, the head ends of the n'-phase armature windings under the S pole of the rotor are simultaneously conducted with the positive pole of the DC power supply, and n+n'≤m wherein the armature windings of the permanent magnet brushless DC motor are single-layer armature windings; it may be assumed that one of the armature windings is numbered i, i=1, 2, ... m, when i<m, the head ends of $i^{th}$-phase armature windings and the tail ends of $(i+1)^{th}$-phase armature windings are alternately arranged in sequence along a circumferential direction; when m is an even number, the head ends of $m^{th}$-phase armature windings are adjacent to the head ends of first-phase armature windings, and the tail ends of the $m^{th}$-phase armature windings are adjacent to the tail ends of the first phase armature windings; and when m is an odd number, the head ends of the $m^{th}$-phase armature windings are adjacent to the tail ends of the first-phase armature windings, and the tail ends of the $m^{th}$-phase armature windings are adjacent to the head ends of the first-phase armature windings.

2. The control system of a flexible permanent magnet brushless DC motor according to claim 1, wherein the control system further comprising a rotor position detection module or a rotor position estimation module, wherein the rotor position detection module comprises a rotor position sensor which collects data of rotation angle of the rotor and sends the collected data to the controller; and the rotor position estimation module collects terminal voltage or data of phase current of each phase for calculation to obtain the data of rotation angle of the rotor and sends the calculated data of rotor position to the controller.

3. A control method of a flexible permanent magnet brushless DC motor utilizing the control system of a flexible permanent magnet brushless DC motor of claim 2, wherein the permanent magnet brushless DC motor is commutated once every 180°/m, the electrical angle 360° is evenly divided into 2*m sectors; the current flows into the n-phase armature windings and flows out of the n'-phase armature windings during each commutation, n+n'≤m, and the remaining armature windings are suspended.

4. The control system of a flexible permanent magnet brushless DC motor according to claim 1, wherein m=12.

5. A control method of a flexible permanent magnet brushless DC motor utilizing the control system of a flexible permanent magnet brushless DC motor of claim 4, wherein the permanent magnet brushless DC motor is commutated once every 180°/m, the electrical angle 360° is evenly divided into 2*m sectors; the current flows into the n-phase armature windings and flows out of the n'-phase armature windings during each commutation, n+n'≤m, and the remaining armature windings are suspended.

6. The control system of a flexible permanent magnet brushless DC motor according to claim 1, wherein the armature windings of the permanent magnet brushless DC motor are hairpin armature windings, the armature windings are inserted into a semi-opened or closed slot; neutral points are composed of copper end rings, and the tail ends of the armature windings are connected to the end rings in a way of wedge, mortise, tenon or welding.

7. A control method of a flexible permanent magnet brushless DC motor utilizing the control system of a flexible permanent magnet brushless DC motor of claim 6, wherein the permanent magnet brushless DC motor is commutated once every 180°/m, the electrical angle 360° is evenly divided into 2*m sectors; the current flows into the n-phase armature windings and flows out of the n'-phase armature windings during each commutation, n+n'≤m, and the remaining armature windings are suspended.

8. The control system of a flexible permanent magnet brushless DC motor according to claim 1, wherein an air-gap magnetic density distribution waveform of the permanent magnet brushless DC motor is a flat-top wave.

9. A control method of a flexible permanent magnet brushless DC motor utilizing the control system of a flexible permanent magnet brushless DC motor of claim 8, wherein the permanent magnet brushless DC motor is commutated once every 180°/m, the electrical angle 360° is evenly divided into 2*m sectors; the current flows into the n-phase armature windings and flows out of the n'-phase armature windings during each commutation, n+n'≤m, and the remaining armature windings are suspended.

10. A control method of a flexible permanent magnet brushless DC motor utilizing the control system of a flexible permanent magnet brushless DC motor of claim 1, wherein the permanent magnet brushless DC motor is commutated once every 180°/m, the electrical angle 360° is evenly divided into 2*m sectors; the current flows into the n-phase armature windings and flows out of the n'-phase armature windings during each commutation, n+n'≤m, and the remaining armature windings are suspended.

11. The control method of the flexible permanent magnet brushless DC motor according to claim 10, wherein a boundary line where a radial magnetic field between the N pole and the S pole of the permanent magnet brushless DC motor is zero is taken as a physical center line, the armature winding on the physical center line is numbered k; when armature windings of one phase are suspended, $k^{th}$-phase armature windings are suspended; when armature windings of more than two phases are suspended, the $k^{th}$-phase armature windings and the armature windings arranged on the left and right of the $k^{th}$-phase armature windings in sequence are suspended.

12. The control method of a flexible permanent magnet brushless DC motor according to claim 10, wherein in a constant-power operation state, a given reference rotating speed range is divided into a plurality of reference rotating speed intervals; a comparison table for the reference rotating speed intervals, the phase number of the armature windings conducted at the same time and a hysteresis comparator are provided; the phase number of the armature windings conducted at the same time in the comparison table is sequentially decreased by one with the decrease of the reference rotating speed; a threshold of the hysteresis comparator is set, for each given reference rotating speed, the phase number of the armature windings initially conducted at the same time is determined by the comparison table; when a difference between the reference rotating speed and the maximum speed in a current rotating speed interval is greater than the threshold, the phase number of the armature windings connected at the same time is increased by one; and when the difference between the reference rotating speed and the minimum rotating speed of the current rotating speed interval in the table is smaller than the negative threshold, the phase number of the armature windings conducted at the same time is decreased by one.

13. The control method of a flexible permanent magnet brushless DC motor according to claim 12, wherein corresponding to each reference rotating speed interval, the DC power supply voltage is modulated into a pulse voltage sequence with a constant frequency and a variable width.

14. A control method of a flexible permanent magnet brushless DC motor utilizing the control system of a flexible permanent magnet brushless DC motor of claim 1, wherein the permanent magnet brushless DC motor is commutated once every 180°/m, the electrical angle 360° is evenly divided into 2*m sectors; the current flows into the n-phase armature windings and flows out of the n'-phase armature windings during each commutation, n+n'≤m, and the remaining armature windings are suspended.

* * * * *